April 1, 1969
G. M. THOMPSON
3,435,929
PNEUMATIC CLUTCH RELEASE ON TRANSMISSION CONTROL
Filed March 17, 1967
Sheet 2 of 2
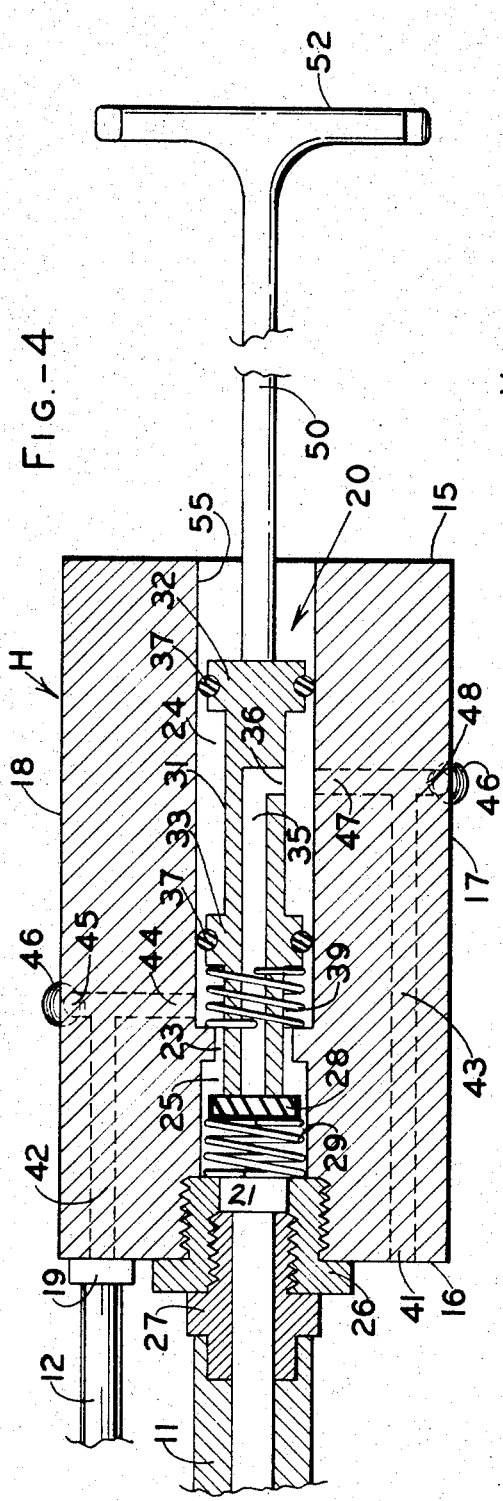
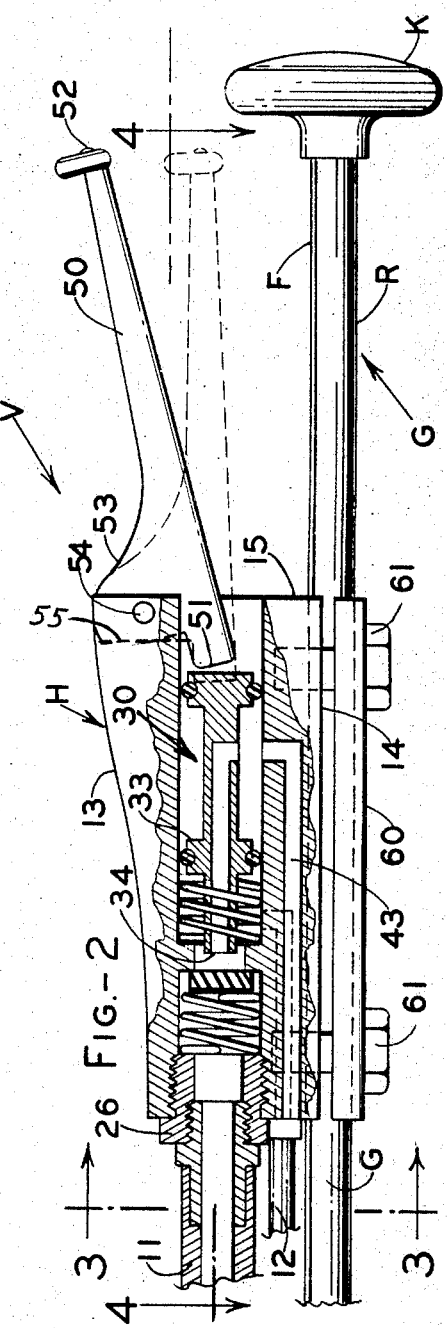
INVENTOR
GARY M. THOMPSON
BY George R Nimmer
ATTORNEY United States Patent Office 3,435,929
Patented Apr. 1, 1969

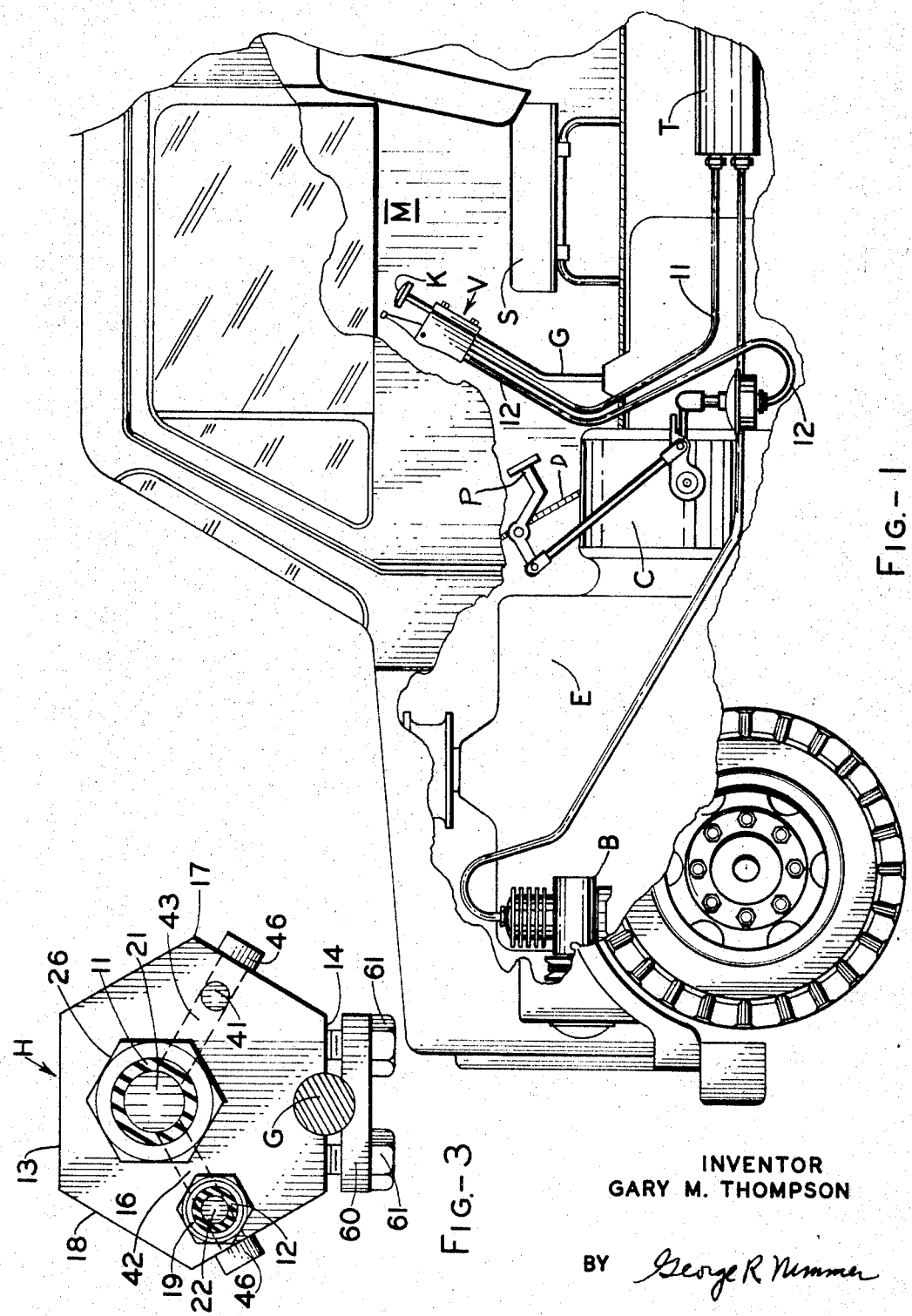

3,435,929
PNEUMATIC CLUTCH RELEASE ON TRANSMISSION CONTROL
Gary M. Thompson, Rte. 1, Box 36,
Omaha, Nebr. 68114
Filed Mar. 17, 1967, Ser. No. 623,884
Int. Cl. F16d 67/00, 21/00, 19/00
U.S. Cl. 192—3.5       3 Claims

ABSTRACT OF THE DISCLOSURE

This invention relates to air-actuatable power-transmission clutches for motor vehicles, and in particular, this invention relates to a novel air valve component that is attached in a unique position along a manually-operated gear shift lever adjacent to the handle portion thereof whereby said air valve may be conveniently, accurately, and easily manually controlled by the motor vehicle operator's gear shifting hand.

---

The power transmission systems of many motor vehicles, especially trucks, are equipped with manual, in counterdistinction to automatic, gear shifting mechanisms. With manual gear shifting mechanisms a clutch mechanism must be temporarily actuatably-disengaged during that time period when the transmission gears are shifted. Typically, the clutch is temporarily actuatably-disengaged by means of a mechanical linkage system that terminates as a depressible foot pedal extending above the floor of the motor vehicle operator's compartment. The repeated "manual" depression of the clutch foot pedal by the motor vehicle operator each time the gears are shifted is eventually tiring to the operator especially in the case of large overland trucks wherein gears must be shifted often and wherein the clutch pedal is relatively difficult to depress repeatedly over a long trip.

It is accordingly a general object of the present invention to provide an auxiliary clutch-actuation mechanism, in addition to the foot-pedal mechanical clutch-actuation mechanism, wherein said auxiliary clutch-actuation mechanism is more conveniently employed by the motor vehicle operator.

It is a specific object of the present invention to provide an auxiliary clutch-actuation mechanism that is powered by superatmospheric air pressure so as to prevent fatigue to the motor vehicle operator. It is an ancillary object that the air-powered actuatable-clutch the conveniently operable with the operator's fingers of the same hand that is concurrently manipulating the gear shift lever.

It is another object of the present invention to provide an air powered clutch-actuation mechanism that is auxiliary to and wholly independent from the foot-pedal mechanical-linkage type, whereby the clutch may be alternatively and independently actuated by either said means.

It is yet another object of the present invention to provide an air-powered clutch-actuation mechanism, together with a novel air valve therefor, that permits the motor vehicle operator to both shift gears and to actuatably-disengage the clutch without removing his hand from the gear shift lever.

It is a further object of the present invention to provide a high degree of clutch control through minimal exertion of the operator's outstretched index and middle fingers.

With the above and other objects and advantages in view, which will become more readily apparent as the description proceeds, this invention comprises the novel configuration, combination, and arrangement of parts, and especially comprising a novel air valve component together with a specified position and location therefor, reference being had to the accompanying drawing wherein like numbers refer to like parts in the several views and in which:

FIGURE 1 is a diagrammatic side elevational view of the driver's or operator's compartment of a typical motor vehicle showing the floor, the operator's chair-like support, a conventional transmission clutch that may be actuatably-disengageable with the operator's foot, a manually-actuatable gear shift lever, the novel air valve at its specified position and location along the gear shift lever, and a compressed air supply.

FIGURE 2 is a side elevational detail view of the novel air valve at its specified position and location along the manually-actuatable gear shift lever, portions of the valve housing being removed to illustrate the internal workings of the valve, especially when said air valve is in the "closed" position.

FIGURE 3 is a sectional bottom plan view of the novel air valve at its specified position and location taken along line 3—3 of FIGURE 2.

FIGURE 4 is a sectional elevational view of the novel air valve, taken along line 4—4 of FIGURE 2, to illustrate especially the internal mechanism when said air valve is in the "open" position.

As is readily apparent in the FIGURE 1 diagrammatic view, a typical air-actuatable clutch component of a motor vehicle power transmission system usually comprises: An air compressor B that may be powered by the vehicle's engine E; a storage tank T for the air so compressed by compressor B; an air-actuatable clutch C; and a valve means V disposed in series between an incoming tubular line 11 leading from storage tank T to valve V and an outgoing tubular line 12 leading from valve V to clutch C. The clutch component C also includes mechanical-linkage actuation means terminating at foot pedal P whereby said clutch component C may be actuated either mechanically as by depressing foot pedal P (of the mechanical linkage), or aerodynamically (as by actuating air valve V), or both, the mechanical and aerodynamic means applied simultaneously.

FIGURE 1 further illustrates the operator's compartment M of a typical motor vehicle, said compartment M comprising a floor D and a substantially horizontal seat-member S which provides support for the operator's body, said seat member S being transversely disposed of the motor vehicle longitudinal axis which extends fore and aft of said vehicle. The foot pedal portion P of the mechanical linkage type clutch actuation means extends above the floor D of compartment M, said pedal P being disposed forwardly of seat member S. There is also a conventional gear shift lever G positioned forwardly of seat-member S whereby the operator may shift the gears of the vehicle's power transmission means during the time interval when the clutch C is actuated. The pneumatically-actuatable clutch of the present invention has its primary utility with overland truck vehicles having upright gear shift levers, and accordingly, the gear shift lever G in FIGURE 1 extends uprightly from compartment floor D and terminates at the upper outward end K thereof with a knob-like handle. Thus, the motor vehicle operator typically manipulates gear shift lever G manually with the palm of his hand extending downwardly and engaged with lever upper end K. Gear shift lever G has a forward side F which is remote of seat-member S and a rearward side R which faces seat member S.

The valve device V has a first port 21 to which incoming tube 11 is attached and at which the superatmospheric air enters valve V, a second port 22 to which outgoing tube 12 is attached and through which the compressed air fluid leaves valve V, and fluid-control means e.g. spindle 30, which controls the amount of compressed air flowing through tubes 11 and 12 to the pneumatically-actuatable clutch C. The fluid-control means e.g. spindle 30, is desirably actuated to the "open" position, for those short durations when it is desired actuatably-disengage the clutch C, with a "pull" toward himself by the operator's fingers. Preferably, the operator utilizes the index and middle fingers of that hand which is engaged with upper end K of gear shaft lever G for shifting the gears, and the clutch C is actuated before the gears are shifted simply by extending the index and middle fingers forwardly to grasp the valve handle 50, whereby a rearward pull on valve handle 50 toward gear shift lever G actuates the air-control means e.g. spindle 30, to the FIGURE 4 "open" position to permit air flow from valve V via tube 12 to ultimately actuably-disengage clutch C.

Conversely, after a gear-shifting operation has been completed, release of valve upright handle 50 from the operator's index and middle fingers allows the fluid-control spindle 30 to reassume its normal FIGURE 2 "off" position whereby clutch C automatically re-engages because of the absence of air flow from valve V along tube 12.

The valve device V further comprises a housing H having a forward side 13, a rearward side 14, a top end 15, a bottom end 16, a first transverse side 17, and a second transverse side 18. Valve device V has a vertically-extending bore 20 commencing at the housing bottom end 16 and extending toward housing top end 15. As can be seen in FIGURES 2 and 4 of the drawing, vertical bore 20 may in fact extend to housing top end 15. Bore 20 is desirably provided with two distinct chambers along the length thereof including upon chamber 24 and lower chamber 25. Further, there is at least one constriction 23 along the length of bore 20 at the juncture of chambers 24 and 25. That portion of bore 20 adjacent to housing bottom end 16, at which the air supply from air line 11 is introduced, provides the valve first port 21. For example, the bore 20 may be threaded adjacent at housing bottom end 16 and may threadedly engage a threaded nipple 26, said nipple being in turn threadedly engaged with a sleeve 27, the longitudinal opening of sleeve 27 providing valve first port 21.

There is an air-impervious barrier, herein as a rubber disc 28, said barrier 28 being located at the upper portion of second chamber 25. Barrier 28 is resiliently urged toward the under side of bore constriction 23 as by means of lower helical spring 29 in second chamber 25 and bearing between barrier 28 and nipple 26. In fact, when valve V is in the FIGURE 2 "closed" position, air-impervious barrier 28 is urged firmly against the under side of bore constriction 23 to prevent air flow between bore chambers 24 and 25.

There is a vertically disposed spindle member 30 which provides the basis of the valve's air control means. Spindle 30 is slidably engaged along bore 20 primarily within first chamber 24, and spindle 30 does not extend into lower chamber 25 when valve V is in the FIGURE 2 "closed" position. Spindle 30 comprises an elongate vertical axle 31 and a pair of integral shoulders at a fixed spacing along axle 31 including a first annular shoulder 32 at the top end and a second annular shoulder 33 positioned between first shoulder 32 and axle bottom end 34. Spindle axle 31 is provided with an internal cavity 35 commencing at axle bottom end 34 and terminating as a sideward opening 36 between shoulders 32 and 33. The said first and second shoulders 32 and 33 are provided with resiliently-deformable annular gaskets 37 that are disposed within circumferentially grooved portions of said shoulder portions 32 and 33. There is an upper helical spring 39 located within bore first chamber 24, said spring 39 resiliently bearing between the lower end of axle bottom shoulder 33 and the upper side of bore constriction 23; by virtue of upper helical spring 39, the spindle 30 is normally resiliently urged in the upper direction toward its upper limit of travel e.g. against bottom end 51 of handle 50, and whereas in the axle bottom end 34 is a finite distance above barrier 28, as shown in FIGURE 2.

Housing H includes two internal passages 42 and 43 commencing at the housing bottom end 16 laterally of bore 20 and first port 21. The first passage 42 provides the valve second port 22 through which air flows from valve V to clutch C via outgoing tubular air line 12. For example, the first passage 42 at housing bottom end 16 may threadedly engage a sleeve 19, to which outgoing air line 12 is attached, the longitudinal opening of sleeve 19 providing valve second port 22. First passage 42 terminates as a lateral opening 44 in first chamber 24 nearer to first chamber bottom end 23 than to the effective top end of first chamber 24, herein as handle lower end 51. For reasons to be described later, housing H includes a first lateral perforation 45 in horizontal alignment with the lateral portion e.g. 44, of first passage 42; there is a cap 46 threadedly engaged with lateral perforation 45 at housing second side 18. The second passage 43 provides the valve exhaust port 41 at housing bottom end 16. Passage 43 termiantes as a lateral opening 47 in first chamber 24 above the lateral opening 44 of first passage 42, said second passage lateral opening 44 being below spindle first top shoulder 32 when spindle 30 is at its upper limit of travel e.g. against handle member lower end 51 in the FIGURE 2 "closed" position. As in the case of first passage 42, housing H desirably includes a lateral perforation, herein as second lateral perforation 48, in horizontal alignment with the lateral portion of first passage 43; similarly, there is a cap 46 threadedly engaged with lateral perforation 48 at housing first side 17.

There is an elongate handle member 50 having a top or outward end 52, a bottom end 51, and a forwardly extending tongue 53 that is disposed nearer to bottom end 51 than to top end 52. Handle top end 52 is preferably as a transverse bar that is of a concave configuration on the forward side thereof, forwardly remote of knob K, so as to facilitate grasping of handle 50 with the fingers of the operator's "gear shift" hand. Handle top end 52 is in substantial horizontal elevational alignment with the upper end K of gear shift lever G so as to render handle top end 52 readily accessible to the outstretched fingers of the operator's gear shifting hand while the palm thereof is engaged with gear shift lever top end K.

The housing upper end 15 is provided with a forwardly extending slot 55 in which handle tongue 53 is disposed. Handle tongue 53 is pivotably attached to housing H by means of a pivot pin 54 passing through housing sides 17 and 18 and through the intervening handle tongue 53, said pivot pin 54 being disposed between vertical bore 20 and housing forward side 13 and also being disposed adjacent to housing top end 15 through slotted portion 55. The bottom end 51 of handle 50 extends rearwardly of pivot pin 54 and into vertical bore 20 immediately above spindle top end shoulder 32. Moreover, spindle 30 is normally urged upwardly by means of upper helical spring 39 bearing between spindle second shoulder 33 and bore constriction 23, and spindle first shoulder 32 is normally urged against handle bottom end 51 whereby handle 50 is normally pivoted forwardly about pivot 54 and the valve V assumes the normally "closed" position of FIGURE 2. Handle tongue 53 bears against the lower base of housing slotted portion 55 (as shown in FIGURE 2), and thus, the top or outward end 52 of handle 50 is disposed a finite distance forwardly of gear shift lever top end K when the valve V is in its normally "closed" poistion; this finite distance is shorter than the reach of the operator's outstretched index and middle fingers when the hand palm is engaged with gear shift lever top K. The distance between handle pivot pin 54 and handle top end 52 bears a ratio of at least 4 with respect to the distance between pivot pin 54 and handle bottom end 51 so as to afford adequate leverage control to fluid-control means 30 by the operator's middle and index fingers.

The valve device V may be readily removably attached at the specified vertical position along the forward side F of gear shift lever G by means of mounting plate 60, positioned at the rearward side R of gear shift lever G. The rearward side 14 of valve housing H and the forward side of mounting plate 60 are provided with vertically disposed grooves to match the contour of curvilinear lever sides F and R, respectively. Mounting plate 60 is removably attached to valve housing H by means of a plurality of threaded fasteners 61 passing through plate 60, through housing rearward side 14, and threadedly engaged with the body of housing H to removably secure valve V at the specified vertical position along gear shift lever G.

The existence of horizontal lateral perforations 45 and 48 permits the alternative employment of these locations for valve second port 22 and exhaust port 41, respectively. Further, the introduction of such horizontal bores 45 and 48 facilitates the provision of lateral openings 44 and 47, respectively, during the manufacturing operation.

Operation of the specifically disposed valve device V is as follows. It will be noted that FIGURE 2 discloses the fluid-control spindle 30 in the normally "closed" position while FIGURE 4 discloses said fluid-control spindle 30 in the "open" position by virtue of handle 50 being moved rearwardly toward gear shift lever G. As can be seen in FIGURE 2, when spindle 30 is urged in its normal upward-closed position by second helical spring 39, the bottom end 34 of spindle 30 is located above air-impervious barrier 28, and barrier 28 is urged snugly against the lower side of bore constriction 23 by lower spring 29 whereby an air-impervious seal is provided between bore chambers 24 and 25. Thus, the incoming air supply from tubular line 11 simply presses barrier 28 against bore constriction 23, and there is no air flow through valve V to clutch C, and clutch C remains engaged.

However, when it is desired to temporarily actuatably-disengage clutch C for the purpose of shifting the power transmission gears, the valve handle 50 is pulled toward gear shift lever G, and handle 50 is pivoted rearwardly about pivot pin 54 so that handle lower first end 51 pushes downwardly on spindle first shoulder 32 whereby the spindle 30 assumes the position shown in FIGURE 4. In the FIGURE 4 "open" position of air valve V the spindle axle lower end 34 presses barrier 28 downwardly of bore constriction 23 to provide an unobstructed path between bore chambers 24 and 25. Thus, air is allowed to flow from air supply tank T, along incoming air line 11 into bore second chamber 25, through constriction 23 into bore first chamber 24, thence through first passageway 42 into outgoing air line 12 to disengage clutch C so long as barrier 28 is depressed below constriction 23 by means of handle 50 and spindle 30. Further, so long as air-impervious barrier 28 is depressed below constriction 23, barrier 28 is also maintained snugly against spindle lower end 34 so as to prevent air flow through axle cavity 35 and thence through exhaust port 41. After the gear shifting operation has been completed by the operator through lever G, the clutch C is allowed to reengage upon the operator's release of the valve handle top end 52 from the index and middle fingers. When the handle top end 52 is so released, the combination of upper helical spring 39 and of the air pressure in first chamber 24 against spindle second shoulder 33 causes spindle 30 to move upwardly thereby releasing the downward pressure upon barrier 28, and barrier 28 is again urged by lower spring 29 into its sealing position against constriction 23. The residual air pressure in first chamber 24 is relieved through exhaust port 41 by way of axle cavity 35, opening 36, and second passage 43. The operation recited in this paragraph and in the paragraph immediately preceding can be repeated each time it is desired to temporarily disengage clutch C by the auxiliary pneumatic means for purposes of shifting the transmission gears, so as to prevent leg fatigue to the operator.

From the foregoing, the construction and operation of the air-actuatable clutch will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. In a motor vehicle mechanism comprising an engine; a plurality of wheels; an operator's compartment including a floor and a generally horizontally seat-member disposed transversely of the vehicle longitudinal axis; a power transmission means including a clutch mechanism and a manually actuatable gear shifting lever to shift the transmission gears during the time when the clutch is actuatably-disengaged, said gear shifting lever extending uprightly from the floor of the operator's compartment and having a knob-like upper end that is manually engageable by the motor vehicle operator's hand with the palm thereof in the downward position, said clutch mechanism being independently actuatably-disengageable with a foot pedal disposed adjacent to the floor of the operator's compartment forwardly of the seat member, said clutch mechanism also being independently actuatably-disengageable with the combination of a compressed air supply directed through tubular lines to the clutch mechanism through an air valve attached to the forward side of the upright gear shifting lever, said air valve having a housing including a first port admitting compressed air and a second port through which compressed air is directed to the clutch mechanism and said air valve having a normally-closed actuator for controlling the amount of air flow from the compressed air supply through the valve housing ports to the clutch mechanism for acutatably-disengaging same; the improvement which comprises the air valve housing having a top end and a bottom end, and having a forward side and a rearward side immediately forward of the gear shifting lever, the valve actuator comprising an elongate handle extending uprightly and along the forward side of the upright gear shifting lever, said elongate handle having a lower end and a transversely-disposed outward portion located above the handle lower end, the elongate handle being pivotably attached to the valve housing nearer to the housing top end than to the housing lower end, said handle having a forward pivoted position located a finite distance forwardly of the gear shifting lever when the air valve actuator is in the normally-closed position and said handle having a rearward pivoted position located a lesser finite distance forwardly of the gear shifting lever when the air valve actuator is in the open position, said handle transversely-disposed outward portion being positioned at substantially common elevation with the gear shifting lever top end at both the forward and at the rearward pivoted positions of the handle, and said handle transversely-disposed outward portion at the forward pivoted position of the handle being accessible to the fingers of the motor vehicle operator's hand when the palm thereof is engaged with the gear shifting lever upper end whereby when the handle is moved to its rearward pivoted position by the operator's fingers air is permitted to flow from the compressed air supply through the air valve and to the pnuematically actuatably-disengageable clutch.

2. The motor vehicle mechanism of claim 1 wherein the valve device housing includes a vertically-extending longitudinal bore commencing at the housing bottom end and extending through the housing top end, said bore providing a first port for said valve device at the housing bottom end, said bore having at least one constriction to provide two distinct chambers along said bore including a first chamber between the handle and the said constriction and a second chamber between the said constriction and the valve first port; said housing having two passageways commencing at the housing bottom end transversely of the central longitudinal bore, the first passageway terminating within the first chamber, the second passageway terminating within the first chamber above the termination of the first passageway to provide an exhaust passage; an air-impervious barrier positioned within the bore second chamber, said barrier being resiliently urged against the bore first constricted portion by means of a lower helical spring positioned within the second chamber and bearing between the first valve port and the bottom side of the barrier; a vertically-extending spindle member positioned along said bore, said spindle comprising an elongate axle and a pair of annular shoulders integrally attached at a spaced interval along said axle, the first annular shoulder being at the top end of said spindle adjacent to the handle lower end and the second annular shoulder being located between the first shoulder and the bottom end of said spindle, the spindle axle having an axial cavity extending from the bottom end of the spindle and terminating as a lateral opening through the side of the axle between the first and second shoulders, said first and second spindle shoulders being slidably disposed along the first chamber, and an upper helical spring disposed within the first chamber between the second constriction and the spindle second shoulder to resiliently urge the spindle upwardly whereby the spindle axle bottom end is positioned above both the second chamber and the air impervious barrier; an elongate handle having a top end, a bottom end, and a forwardly extending tongue nearer to the handle bottom end than to the handle top end, said elongate handle tongue being pivotably attached to the housing near the top end, the bottom end of the handle bearing against the spindle first shoulder whereby when the handle transversely-disposed outward portion is moved rearwardly toward the gear shift lever the spindle bottom end contacts the barrier and moves it downwardly below the second constricted portion against the lower helical spring.

3. The valve device of claim 2 wherein the valve device housing has a pair of opposed transverse sides including a first side and a second side extending between the housing top and bottom ends, said valve housing having a lateral perforation commencing at the housing first side and ending within the fore first chamber adjacent to the valve first passage said valve housing perforation being closed with a removable cap at the housing first side, said valve housing having an exhaust port commencing at the housing lower side and terminating as a lateral opening in the bore first chamber, said valve housing having a lateral perforation commencing at the housing second side and ending within the lateral opening of the exhaust passageway said valve housing second side lateral perforation being closed with a removable cap; wherein the rearward side of the valve housing is provided with a groove extending between the valve housing top and bottom ends to match the contour of the gear shift lever forward side; wherein the valve housing is removably attached to the forward side of the gear shift lever with a mounting plate on the rearward side of the gear shift lever, the forward side of the mounting plate being grooved to match the contour of the gear shift lever rearward side, said mounting plate being removably attached to the valve housing with a plurality of threaded fasteners positioned on both lateral sides of the gear shift lever; wherein the transverse bar top end of the valve handle has a concave forward side; wherein the length ratio between the handle top end and its pivotal connection to the housing as compared to the handle length from its bottom end to its pivotal connection with the valve housing is at least 4.0; wherein the spindle shoulders are circumferentially grooved; and wherein an annular resilient gasket is provided within said spindle shoulder grooves to provide an air seal between said shoulders and the housing bore.

References Cited

UNITED STATES PATENTS

| 1,747,190 | 2/1930 | Sheirs | 192—91 |
| 2,078,173 | 4/1937 | Brewer | 192—91 |
| 2,753,025 | 7/1956 | Reis. | |
| 2,916,118 | 12/1959 | Backus et al. | |

BENJAMIN W. WYCHE III, *Primary Examiner.*

U.S. Cl. X.R.

192—91